(12) United States Patent
Sinha et al.

(10) Patent No.: US 9,455,915 B2
(45) Date of Patent: Sep. 27, 2016

(54) HIERARCHICAL CONGESTION CONTROL WITH CONGESTED FLOW IDENTIFICATION HARDWARE

(71) Applicant: Broadcom Corporation, Irvine, CA (US)

(72) Inventors: Santanu Sinha, Cupertino, CA (US); Karen Schramm, Needham, MA (US)

(73) Assignee: Broadcom Corporation, Irvine, CA (US)

( * ) Notice: Subject to any disclaimer, the term of this patent is extended or adjusted under 35 U.S.C. 154(b) by 120 days.

(21) Appl. No.: 14/139,185

(22) Filed: Dec. 23, 2013

(65) Prior Publication Data

US 2015/0172193 A1 Jun. 18, 2015

Related U.S. Application Data

(60) Provisional application No. 61/915,465, filed on Dec. 12, 2013.

(51) Int. Cl.
*H04L 12/801* (2013.01)
*H04L 12/825* (2013.01)
*H04L 12/863* (2013.01)
*H04L 12/815* (2013.01)
*H04L 12/891* (2013.01)

(52) U.S. Cl.
CPC .............. *H04L 47/12* (2013.01); *H04L 47/22* (2013.01); *H04L 47/25* (2013.01); *H04L 47/50* (2013.01); *H04L 47/41* (2013.01)

(58) Field of Classification Search
CPC ....................................... H04L 47/12
See application file for complete search history.

(56) References Cited

U.S. PATENT DOCUMENTS

| | | | |
|---|---|---|---|
| 2007/0081454 A1* | 4/2007 | Bergamasco et al. | 370/229 |
| 2007/0230493 A1* | 10/2007 | Dravida et al. | 370/412 |
| 2008/0140877 A1* | 6/2008 | Baba et al. | 710/23 |
| 2009/0046581 A1* | 2/2009 | Eswaran et al. | 370/230 |

(Continued)

OTHER PUBLICATIONS

Alizadeh et al., "Less is More: Trading a little Bandwidth for Ultra-Low Latency in the Data Center", NSDI '13: 10th USENIX Symposium on Networked Systems Design and Implementation, Apr. 3-5, 2013, 14 pages.

(Continued)

*Primary Examiner* — John Blanton
(74) *Attorney, Agent, or Firm* — Fiala & Weaver P.L.L.C.

(57) ABSTRACT

Hierarchical congestion identification and control hardware supports multi-level congestion control at flow, tenant and virtual machine (VM) levels. Hardware implementation expedites response to congestion notifications and frees-up processor bandwidth. A hierarchy of transmit shapers in a transmit ring scheduler isolate rate adjustments for flows, tenants and VMs. The hierarchy of shapers provide a hierarchy of congestion control nodes to control flows and aggregate flows. Hardware quickly associates congested flows with shapers before or after receiving a congestion notification. The associations may be used by any flow control algorithm to selectively rate-control shapers to control flow rates. Shaper associations and configured states, scheduler configuration, congestion states, thresholds and other flow information may be stored and monitored to filter data flows that need attention and to raise alerts at flow, tenant and VM levels. Congestion control occurs fast and without packet modification, queue or ring switching or queue accumulation.

20 Claims, 4 Drawing Sheets

(56) References Cited

U.S. PATENT DOCUMENTS

| | | | |
|---|---|---|---|
| 2013/0215743 A1* | 8/2013 | Pannell | 370/230.1 |
| 2014/0153388 A1* | 6/2014 | Webb et al. | 370/230 |
| 2014/0282529 A1* | 9/2014 | Bugenhagen | 718/1 |

OTHER PUBLICATIONS

Jeyakumar et al., "EyeQ: Practical Network Performance Isolation for the Multi-tenant Cloud", HotCloud '12 was held in conjunction with the 2012 USENIX Federated Conferences Week, Jun. 12-15, 2012, 6 pages.

Jeyakumar et al., "EyeQ: Practical Network Performance Isolation at the Edge", NSDI '13: 10th USENIX Symposium on Networked Systems Design and Implementation, Apr. 3-5, 2013, 15 pages.

Rodrigues et al., "Gatekeeper: Supporting Bandwidth Guarantees for Multi-tenant Datacenter Networks", presented at Workshop on I/O Virtualization (WIOV'11), Portland, OR, Jun. 14, 2011, 9 pages.

* cited by examiner

HIERARCHICAL CONGESTION CONTROL WITH CONGESTED FLOW IDENTIFICATION HARDWARE

CROSS-REFERENCE TO RELATED APPLICATIONS

This application claims priority to U.S. Provisional Patent Application No. 61/915,465, filed Dec. 12, 2013, and entitled "Hierarchical Congestion Control With Congested Flow Identification Hardware," the entirety of which is incorporated by reference herein.

BACKGROUND

Congestion in a data center network negatively impacts network performance by causing increased delays and/or lost packets. In a network shared by multiple tenants (e.g., cloud services), where each tenant may have its own service level agreement (SLA), congestion by one tenant and an attempt to resolve congestion may impact another tenant's traffic, possibly in violation of an SLA.

Known or proposed congestion control mechanisms include in-band techniques (i.e., having congestion control built into a protocol), such as explicit congestion notification (ECN) and high bandwidth ultra-low latency (HULL), and out of band techniques, such as quantized congestion notification (QCN), EyeQ and Gatekeeper. Software implementations of congestion control are relatively slow to respond to congestion and consume large numbers of host processor compute cycles to perform congestion control. HULL, a hardware acceleration technique, does not attempt to isolate tenant traffic, requires expensive deep buffering of paced traffic in hardware, and may cause potential packet reordering when a paced flow switches queues.

Thus, congestion control in data center networks running high speed 40G/50G/100G servers, including those sharing resources among tenants, has problems including slow response to congestion notifications, complex processing requiring excessive consumption of processor bandwidth, costly deep buffering in packet transmission queues, disruption of flows from other tenants and even uncongested flows from the same tenant, loss of network efficiency and interference with service level agreements (SLAs).

BRIEF SUMMARY

Methods, systems, and apparatuses are described for hierarchical congestion identification and control hardware, substantially as shown in and/or described herein in connection with at least one of the figures, as set forth more completely in the claims.

BRIEF DESCRIPTION OF THE DRAWINGS/FIGURES

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies. However, embodiments are not limited to the specific implementations disclosed herein.

Exemplary embodiments will now be described with reference to the accompanying figures.

DETAILED DESCRIPTION

I. Introduction

Reference will now be made to embodiments that incorporate features of the described and claimed subject matter, examples of which are illustrated in the accompanying drawings. While the technology will be described in conjunction with various embodiments, it will be understood that the embodiments are not intended to limit the present technology. The scope of the subject matter is not limited to the disclosed embodiment(s). On the contrary, the present technology is intended to cover alternatives, modifications, and equivalents, which may be included within the spirit and scope the various embodiments as defined herein, including by the appended claims. In addition, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the embodiments presented.

References in the specification to "embodiment," "example" or the like indicate that the subject matter described may include a particular feature, structure, characteristic, or step. However, other embodiments do not necessarily include the particular feature, structure, characteristic or step. Moreover, "embodiment," "example" or the like do not necessarily refer to the same embodiment. Further, when a particular feature, structure, characteristic or step is described in connection with an embodiment, it is within the knowledge of one skilled in the art to effect it in embodiments.

Certain terms are used throughout the following description and claims to refer to particular system components and configurations. The discussion of embodiments is not intended to distinguish between components that differ in name but not function. The terms "including" and "comprising" are used in an open-ended fashion, and thus should be interpreted to mean "including, but not limited to . . . "

Also, the term "couple" or "couples" is intended to mean either an indirect or direct electrical connection.

II. Exemplary Hierarchical Congestion Control with Congested Flow Identification Hardware Methods, systems, and apparatuses will now be described for hierarchical congestion identification and control hardware. Hierarchical congestion identification and control hardware supports multi-level congestion control at flow, tenant and virtual machine (VM) levels. Hardware implementation expedites response to congestion notifications and frees-up processor bandwidth. A hierarchy of transmit shapers in a transmit ring scheduler isolate rate adjustments for flows, tenants and VMs. The hierarchy of shapers provide a hierarchy of congestion control nodes to control flows and aggregate flows. Hardware quickly associates congested flows with shapers before or after receiving a congestion notification. The associations may be used by any flow control algorithm to selectively rate-control shapers to control flow rates. Shaper associations and configured states, scheduler configuration, congestion states, thresholds and other flow information may be stored and monitored to filter data flows that need attention and to raise alerts at flow, tenant and VM levels. Congestion control occurs fast and without packet modification, queue or ring switching or queue accumulation.

For example, in one embodiment, a method comprises: scheduling service for data to be transmitted as a data flow comprising a plurality of packets transmitted at a flow rate based on a rate of the service, the rate of the service being controllable by at least one shaper in a hierarchy of shapers providing a hierarchy of congestion control nodes; scheduling transmission of a first packet in the data flow; transmitting the first packet in the data flow; receiving a congestion notification regarding the data flow; and associating the congested data flow with the first shaper. The association may be used by any congestion control technique to modify the flow rate by modifying the rate of the service provided by the at least one shaper.

The service may be scheduled by a scheduler, such as a transmit ring scheduler in a network interface controller (referred to herein as "NIC" for purposes of brevity). The service being scheduled may comprise, for example, access to the data or queuing of packets comprising portions of the data. The rate of the at least one service may be modified by providing hierarchical congestion control by choosing among options to modify a rate of service provided by a first shaper at a first level in the hierarchy and a rate of service provided by a second shaper at a second level in the hierarchy of shapers.

Hierarchical congestion control may be provided by choosing among options to control the rate of the data flow alone and combined with other flows in an aggregate data flow by choosing among options to control the first shaper and the second shaper in multiple levels of the hierarchy of shapers. Hierarchical congestion control may choose among options to control the rate of the data flow at a virtual machine level without affecting a rate of data for other virtual machines, a tenant level without affecting a rate of data flow for other tenants and a flow level without affecting a rate of data flow for other flows by choosing among options to control the first shaper and the second shaper in multiple levels of the hierarchy of shapers.

In some embodiments, such as out-of-band congestion control techniques, associating congested data flow with at least one shaper may comprise inserting in a data packet a flow identifier identifying the data flow; and associating the flow identifier to an identifier for the at least one shaper. Subsequently, e.g., upon receiving a congestion notification, associating may comprise extracting from the congestion notification a flow identifier that identifies the data flow; and using the flow identifier to identify the at least one shaper from the association.

In some other embodiments, such as in band congestion control techniques, associating congested data flow with at least one shaper may comprise extracting from the congestion notification flow information indicating a reportedly congested data flow; monitoring, based on the extracted flow information, subsequent packets to be transmitted to identify a packet in the reportedly congested data flow; identifying, based on the identified data packet, at least one shaper in the hierarchy of shapers that control a rate of service for data packetized in the identified data packet; and associating the reportedly congested data flow with the identified at least one shaper.

Information useful to congestion control may be stored, such as configuration of a service scheduler; associations between a plurality of shapers in the hierarchy of shapers and a plurality of data flows; congestion states for each data flow; and configured rates of the plurality of shapers. A flow control algorithm may be executed, based on the stored information, to determine new rates for shapers associated with congested data flows. An alert may be raised, based on the stored information, when multiple flows of a virtual machine are reportedly congested.

In another embodiment, an apparatus, such as a network interface controller, comprises: a service scheduler configured to schedule service for a plurality of data to be transmitted as a plurality of data flows each comprising a plurality of packets, the service scheduler comprising a hierarchy of shapers providing a hierarchy of congestion control nodes that control a rate of each data flow by controlling a rate of the service for each data to be transmitted; a packet transmission scheduler configured to schedule transmission of the plurality of packets for each of the data flows; a congestion circuit configured to identify at least one shaper in the hierarchy of shapers that control a rate of the service for a congested data flow; and a flow rate controller configured to access states and configurations for shapers and to modify the rate of the congested data flow by modifying the rate of the service provided by the identified at least one shaper.

In some embodiments, the apparatus comprises a network interface controller and the service scheduler comprises a transmission ring scheduler in the network interface controller. The hierarchy of shapers that provide a hierarchy of congestion control nodes may be configured to permit the flow rate controller to control the rate of the congested data flow at two or more of a virtual machine level, a tenant level and a flow level by controlling rates of service provided by shapers at different levels in multiple levels of the hierarchy of shapers. The congestion circuit may be configured to associate or identify at least one shaper in the hierarchy of shapers with at least one data flow before and after a congestion notification is received about the data flow.

In another embodiment, a method may comprise monitoring a plurality of received data flows in a network with end to end (e2e) congestion control; filtering the received data flows in hardware to identify data flows that require rate adjustment; storing flow information for the identified flows in memory accessible to a rate control circuit; dividing, by the rate control circuit, receiver bandwidth among sender virtual machines sending the received data flows; and sending a message to at least one sender virtual machine. The method may further comprise controlling, in response to the message, a rate of an identified data flow by controlling at least one shaper in a hierarchy of shapers that control a rate of queuing data packets to be transmitted in the identified data flow. Filtering and storing may occur periodically according to a period and the stored flow information may be transferred in accordance with the period from a hardware table to memory accessible to the rate control circuit. Filtering the data flows to identify data flows that require rate adjustment may comprise periodically comparing a flow counter for each flow to a threshold for each flow to identify flow rates in excess of the threshold.

Examples of these and further embodiments are described as follows. For the purposes of the description provided herein, a server transmitting packets through a network interface controller (NIC) is a source point (SP) and a congestion reaction point (RP), a switch in the network is a potential congestion point (CP), and a desktop computer requesting data is a data destination or endpoint (EP).

Figure 1:
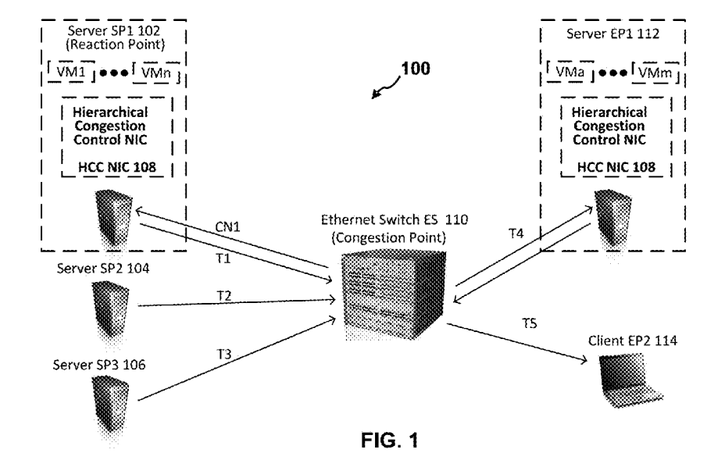
FIG. 1 shows a block diagram of an exemplary data center network environment in which embodiments of hierarchical congestion control with congested flow identification hardware may be implemented.

FIG. 1 shows a block diagram of an exemplary data center network environment in which embodiments of hierarchical congestion control with congested flow identification hardware may be implemented. Data center network 100 comprises first server or source point SP1 102, second server SP2 104, third server SP3 106, Ethernet switch ES 110, first endpoint EP1 112 (a server) and second endpoint EP2 114 (a client). First endpoint EP1 112 may also be referred to as fourth server EP1 112. Each device may comprise a computer hosting a network interface controller (NIC), which may be implemented in a network interface card. NICs may be appropriately suited for their respective implementation. For instance, a NIC for a client endpoint is considerably less complicated and high performance than a 40G/50G/100G NIC in a server endpoint. Network 100 is shown as one example implementation. There are countless embodiments of networks in which hierarchical congestion control with flow identification hardware may be implemented. Network protocols and congestion protocols may vary among many possible embodiments. Internet Protocol (IP) traffic may comprise one or both Transmission Control Protocol (TCP) and User Datagram Protocol (UDP) traffic. With respect to congestion notifications, some embodiments may be in band while others may be out of band.

First, second and third servers SP1-SP3 are indicated to be sources of traffic, although they may also be destinations in network 100. Similarly, first and second endpoints EP1-EP2 are indicated to be destinations of traffic, but they may also be sources in network 100. As shown, first server SP1 102 transmits first traffic T1, second server SP2 104 transmits second traffic T2, and third server SP3 106 transmits third traffic T3. First, second and third traffic T1-T3 are received by Ethernet switch ES 110, which routes traffic in network 100. As shown, Ethernet switch ES 110 routes fourth traffic T4 to the destinations identified as first endpoint EP1 112 and fifth traffic T5 to second endpoint EP2 114. Network 100 may comprise many switches and many more sources and destinations. In this example, Ethernet switch ES 110 is indicated to be a congestion point (CP). As indicated in FIG. 1, the congestion is caused by first server SP1 102, which is a reaction point (RP). Ethernet switch ES 110 provides a congestion message CN1 to first server SP1 102.

First server SP1 102 comprises hierarchical congestion control (HCC) NIC 108. HCC NIC 108 comprises a hardware implementation that provides a fast response to network congestion. HCC NIC 108 associates a flow reported to be congested in congestion notification message CN1 to one or more shapers in a hierarchy of shapers. The hierarchy of controllable shapers may be in a transmit ring scheduler of HCC NIC 108. Each shaper may be identified by a unique congestion control node (CCN) identifier (ID). The association of flows to the hierarchy of shapers permits control of the congested flow in first traffic T1 by controlling associated shapers. By using hardware identification and association of flows to a hierarchy of controllable shaper(s), the need for the processor(s) in first server SP1 102 to maintain associations in software for hundreds to thousands of flows is eliminated, which results in faster response to network congestion and frees up processor bandwidth.

An internal or external rate control algorithm implemented in hardware, firmware and/or software, which may be executed by one or more processors in first server SP1 102, uses the hardware association of flows and shapers to selectively control the rate of one or more shapers associated with scheduling transmission service for data in the congested data flow. Rate control may be implemented with a custom congestion control algorithm or any known congestion control algorithm, such as in ECN, QCN, HULL or EyeQ, among others. Shapers associated with other, uncongested, flows may be left alone. The hierarchy of shapers provides multiple levels of control to target individual flows and aggregate flows while isolating other flows, VMs and/or tenants from congestion control, which may be helpful to maintain SLAs for tenants or particular traffic.

HCC NIC 108 permits TCP/UDP flow control without any packet modification, which means network equipment such as Ethernet switch ES 110 need not be upgraded to function with HCC NIC 108. Also, the rate of transmission service may be controlled prior to queuing data packets. For example, HCC NIC 108 permits control of the rate of service for descriptor rings in a transmit ring scheduler instead of the rate of scheduling transmission of packets stored in packet queues. Packet descriptors in rings work their way through a hierarchy of rate-controllable shapers providing multi-level or hierarchical control opportunities to rate control flows. This enables congestion control of hundreds to thousands of TCP/UDP flows before packets are stored in hardware packet buffers in a NIC. Accordingly, HCC NIC 108 avoids an expensive increase in buffer storage for queued packet control necessary in HULL.

Figure 2:
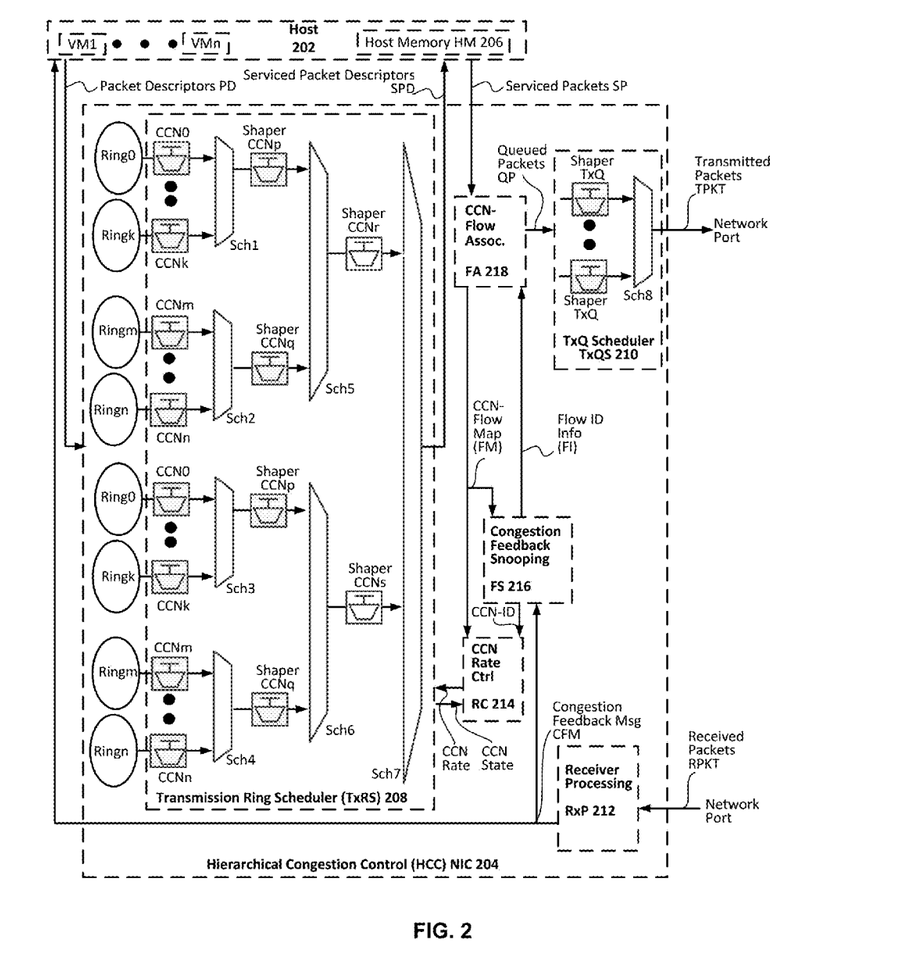
FIG. 2 shows a block diagram of an exemplary embodiment of hierarchical congestion control with congested flow identification hardware.

One of many possible embodiments of HCC NIC 108 is presented in FIG. 2. FIG. 2 shows a simplified block diagram representation of a Host 202 with an HCC NIC 204. HCC NIC 204 is an example of HCC NIC 108 of FIG. 1. Host 202 may comprise any computer(s) that host(s) a NIC, although in this embodiment Host 202 comprises first server SP1 102. Host SP1, as a computer, may comprise any of a wide variety of known components, including but not limited to one or more processors coupled (e.g., by one or more buses) to volatile and non-volatile memory storing data, firmware and software comprising operating system(s), applications, programs and modules providing executable instructions to processor(s), input and output (I/O) interfaces, communications interfaces. However, for simplification, Host SP1 is only shown with Host Memory HM 206 and a plurality of virtual machines VM1-VMn. Among other things, Host Memory HM 206 stores data to be transmitted as packets in one or more data flows in first traffic T1. Host Memory HM 206 is written to and read from by HCC NIC 204. HCC NIC 204 may be implemented, for example, as embedded circuitry or in an ASIC.

A virtual machine ('VM') is a software construct operating on a computing device (i.e., Host 202) to provide an emulated machine or system. A VM may be an application executed by host processor(s) to instantiate a use application while isolating the use application from the host device or from other applications executed by the host. A host can have many VMs, each operating according to resources available from the host. Each VM as hosted on a computing device is a computing machine, albeit in virtual form. Each VM represents itself as such to the use application therein and to the outside world. Each VM and/or use application therein can issue hardware requests for hardware resources of the VM, even though the VM does not actually have the hardware resources. Hardware requests are intercepted or otherwise redirected to the host to service those requests. A host may deploy each VM in a separate partition, address space, processing area, etc. A host may have a virtualization layer with a virtual machine monitor ('VMM') that acts as an overseer application or "hypervisor." The virtualization layer oversees or manages supervisory aspects of each VM and acts as a link to the resources outside each VM by intercepting or redirecting requests. The VMM may provide error handling, system faults, or interrupt handling for each VM. A VMM may be a separate application running in its own address space or may be integrated with the host operating system, either directly or as an operating system extension, such as a device driver.

HCC NIC 204 comprises a plurality of hardware rings Ring0-k and Ringm-n, transmission ring scheduler TxRS 208 (also referred to herein as a "service scheduler"), transmission queue scheduler TxQS 210 (also referred to herein as a "packet transmission scheduler"), receiver processing RxP 212 (also referred to herein as a "receiver processing logic"), congestion control node (CCN) rate control RC 214 (also referred to herein as a "flow rate controller"), congestion feedback snooping FS 216 (also referred to herein as a "congestion circuit"), and CCN flow association FA 218 (also referred to herein as "flow association logic"). In some embodiments, each of these functional blocks or modules is implemented in hardware. In some embodiments, CCN rate control, and the algorithm(s) underlying it, may also be implemented in software, firmware or a combination of any two or more of software, firmware and hardware, including any rate or congestion control technique that can operate or be adapted to operate with HCC NIC 204. For example, congestion control methods such as ECN and QCN may provide indications of network congestion to HCC NIC 204 while actual congestion control is offloaded from software processing to hardware in HCC NIC 204, leveraging knowledge about which flows are mapped to which rings and associated hierarchical, multi-level shapers providing hierarchical, multi-level congestion control nodes (CCNs) used to rate control flows and/or aggregate flows.

Hardware rings (also referred to as transmit or send rings) Ring0-k and Ringm-n are transmit rings coupled between Host 202 and transmission ring scheduler TxRS 208. Hardware rings Ring0-k and Ringm-n are queues that buffer a link list of packet descriptors. Each packet descriptor points to a data buffer in Host Memory. Host software maps each data flow (e.g., TCP/UDP data flow) to a transmit (send) ring. In some embodiments, each tenant in multi-tenant network 100 may be assigned one or more VMs with access to one or more hardware rings, enabling tenants to have dedicated resources. While it may be optimal to have a one-to-one mapping of send rings to flows, in some embodiments, such as when there are more flows than rings, there may be a one-to-many mapping of send rings to flows, in which case a ring is referred to as a shared ring. In some embodiments, when multiple flows are mapped to a shared ring, all mapped flows may be from the same tenant in order to isolate traffic from each tenant for purposes of congestion control and SLA maintenance. The model of dedicated resources for each tenant may also include other features, such as single-root, I/O virtualization (SR-IOV).

Transmission ring scheduler TxRS 208 comprises a plurality of first level transmit (send) shapers CCN0-k and CCNm-n, a plurality of second level shapers CCNp-q, a plurality of third level shapers CCNr-s, a plurality of first level schedulers Sch1-4, a plurality of second level schedulers Sch5-6 and a third level scheduler Sch7. Although three levels or tiers of CCNs and schedulers are shown in this embodiment, other embodiments may have more or fewer levels in their multi-level hierarchy. Each shaper is identified by a congestion control node (CCN) identifier. In this embodiment, a letter following CCN indicates a unique CCN ID, but implementations may provide any CCN ID to each shaper. The CCN ID is used to identify which shaper to control for a particular flow or flows. The rate of each shaper is controllable to set a rate at which packet descriptors are provided by a shaper to a respective scheduler.

As shown in this embodiment, each transmit ring in the plurality of rings Ring0-k and Ringm-n is coupled to a respective shaper in the plurality of first level transmit or send shapers CCN0-k and CCNm-n. Repetition of ring and shaper identifiers indicates parallel processing of a plurality of packet descriptors for a data flow. The output of each shaper in the plurality of first level shapers CCN0-k is coupled to an input of first scheduler Sch1 and third scheduler Sch3. The output of each shaper in the plurality of first level shapers CCNm-n is coupled to an input of second scheduler Sch2 and fourth scheduler Sch4. The output of first scheduler Sch1 is coupled to an input of second level shaper CCNp. The output of second scheduler Sch2 is coupled to an input of second level shaper CCNq. The output of third scheduler Sch3 is coupled to an input of second level shaper CCNp. The output of fourth scheduler Sch4 is coupled to an input of second level shaper CCNq. As shown in FIG. 2, these four second level shapers CCNp-q are coupled between first and second levels of schedulers, i.e., first level schedulers Sch1-4 and second level schedulers Sch5-6, while third level shapers CCNr-s are coupled between second and third levels of schedulers, i.e., second level schedulers Sch5-6 and third level scheduler Sch7.

The three levels of rate control for data flow packet descriptors moving through the hierarchy or funnel of TxRS 208 provide what may be variously referred to as hierarchical, multi-level or multi-tier flow rate control for general purpose flow rate control and/or specific network congestion control. It may be observed how the hierarchy permits single and multi-flow (aggregate flow) rate control, single and multi-tenant flow rate control, VM and multi-VM flow rate control in accordance with mapping flows and a rate control algorithm. For example, Higher levels may be mapped as desired in many possible configurations. In one embodiment, each second level shaper may be mapped to a different VM. A first tenant may be assigned first VM VM1 and first set of rings Ring0-k to handle flow traffic for the first tenant while a second tenant may be assigned second VM VM2 and second set of rings Ringm-n to handle flow traffic for the second tenant. In that example, controlling any of first and second level shapers CCN0-k and CCNp would provide VM level control and tenant level control. If a ring is only mapped to one flow then control of a first level shaper would also provide flow level control, as opposed to aggregate flow level control when multiple flows are controlled by a shaper.

In some embodiments, operation may comprise a VM or other software executed by Host 202 causing descriptors of packets for a data flow to be written to a ring, such that the ring maintains a link list of packet descriptors for the data flow. This may be repeated for each data flow and the ring it is associated with. TxRS 208 selects a ring for service, which results in a direct memory access (DMA) by HCC NIC 204. As shown in FIG. 2, this may be effectuated by passage of a packet descriptor through the hierarchy of TxRS 208, where the packet descriptor at the output of TxRS 208 is referred to as Serviced Packet Descriptor SPD. Serviced packet descriptor SPD may be used in the DMA to access data in Host Memory HM 206 identified by the SPD. The data accessed in host memory HM 206 is packetized and provided as a data packet (i.e., a serviced packet SP) to CCN flow association FA 218. As described in more detail below, CCN-flow association FA 218 may insert a flow ID, CCN ID or association ID in serviced Packet SP depending on the communication protocol. CCN-flow association FA 218 provides serviced packet SP, whether modified or not, as queued packet QP to transmission queue scheduler TxQS 210.

TxQS 210 receives queued packets QP from CCN flow association FA 218 and stores them in packet queues. TxQS 210 comprises transmission queue shapers TxQ that rate control transmission of queued packets QP. Transmission queue scheduler element Sch8 selects queued data for transmission to network 100 (FIG. 1) through Network Port A, wherein a queued packet QP that has been transmitted is referred to as a transmitted packets TPKT. Transmitted packets TPKTs may be combined with other packets in first traffic T1, which may be sent to an appropriate endpoint by Ethernet switch ES 110.

Receiver processing RxP 212 receives packets. Received packets RPKT may include congestion notifications, such as first congestion notification CN1, regarding data flows transmitted by HCC NIC 204 that are reportedly causing congestion. Depending on the protocol, a congestion notification may be in band or out of band. Receiver processing RxP 212 processes received packets RPKT to extract congestion feedback message CFM, which it provides to congestion feedback snooping FS 216 and to Host 202. Congestion feedback snooping FS 216 analyzes congestion feedback message FM as a hardware function much faster than a software implementation, such as ECN.

Congestion feedback snooping FS 216 processes each congestion feedback message CFM in the receive direction in order to identify one or more flows experiencing congestion. Congestion feedback snooping FS 216 may be configured or configurable to handle one or more varieties of congestion feedback. An example of in band congestion feedback is an ECE bit or flag in a TCP acknowledge (Ack) message from a TCP destination, such as first endpoint EP1 112 back to the source (e.g., first server SP1 102). In band congestion feedback is also provided by HULL. An example of out of band congestion feedback is a congestion notification message (CNM) in QCN protocol from a congestion point (CP), such as Ethernet switch (ES), to a reaction point (RP) (e.g., first server SP1 102). EyeQ and Gatekeeper have different formats for congestion notification messaging, but generally indicate congestion feedback in the form of a message that would be provided by a receiver module. Congestion feedback snooping FS 216 may be configured to handle these and other types of congestion feedback possible in other network communication protocols.

Congestion feedback snooping FS 216 may have multiple modes of operation, e.g., depending on communication protocols. If equipment in network 100, such as Ethernet switch ES 110, supports a congestion control protocol that permits a special tag (e.g., CN-TAG in QCN) to indicate a flow-ID, then congestion feedback snooping FS 216, in a first operating mode, may capture the flow-ID in received congestion feedback messages FMs. Both one-to-one and many-to-one mappings between the CCN ID and flow-ID may be supported.

Further, if special flow-ID tags are permitted by network 100, then CCN-Flow association FA 218 may modify serviced packets SPs by inserting a flow-ID before providing the modified packets as queued packets QPs to TxQS 210. This flow-ID may be extracted from transmitted messages and inserted into return messages, such as acknowledgements, by other network equipment, such as first endpoint EP1 112. Flow ID may be directly mapped to the associated CCN ID(s), which mapping/association may be kept in a local database (e.g., hardware table) by CCN flow association FA 218. Congestion feedback snooping FS 216 provides the congestion state and CCN ID to CCN Rate Control RC 214, requiring no Host software intervention.

If network 100 does not support a congestion control protocol that inserts a special tag with a flow-ID, then congestion feedback message CFM, such as a TCP Ack, with an ECE flag, does not contain a specific identifier that can be used to associate the congested flow with a shaper, i.e., congestion control node (CCN), in Tx Ring Scheduler TxRS 208. Accordingly, congestion feedback snooping FS 216 extracts flow ID information FI from congestion feedback message CFM. Flow ID information may comprise, for example, IP source/destination and TCP source/destination information extracted from a TCP Ack packet. Congestion feedback snooping FS 216 may then direct CCN-flow association FA 218, e.g., by way of a flow ID request, to use flow ID info FI to learn the association between the flow and a shaper CCN ID. As discussed below, CCN-flow association FA 218 determines a shaper CCN ID associated with flow ID info FI, which may be entered into its local database for subsequent reference, and provides CCN-flow map FM to congestion feedback snooping FS 216 and CCN rate control RC 214.

Like congestion feedback snooping FS 216, CCN-flow association FA 218 may have multiple modes of operation, e.g., depending on communication protocols. Each mode may be accomplished without software intervention. As previously indicated, if special flow-ID tags are permitted by network 100, then CCN-Flow association FA 218 may modify serviced packets SPs by inserting a flow-ID before providing the modified packets as queued packets QPs to TxQS 210. Flow ID may be directly mapped to the associated CCN ID(s), which mapping/association may be stored in a local database (e.g., hardware table) by CCN flow association FA 218. Hardware insertion of flow ID by CCN-flow association FA 218 eliminates flow ID determination tasks from software for protocols such as QCN that hash a flow to find its flow ID. A direct mapping in hardware is much faster. The flow ID embedded in transmitted packets TPKT by CCN-flow association FA 218 is then returned and used by congestion feedback snooping FS 216 to associate the flow ID with one or more shaper CCN IDs.

If special flow-ID tags are not permitted by network 100, then CCN-Flow association FA 218 supports a learning function as discussed above. CCN-flow association FA 218 maintains a hardware state table to handle such requests by congestion feedback snooping FS 216. Each serviced packet SP may be accompanied by metadata stored in the state table. For example, metadata may include a send ring to which a packet descriptor for the packet was assigned. CCN-flow association FA 218 monitors the hardware state table for serviced packets SPs (i.e., packets to be transmitted) with flow information matching that provided in flow ID information FI. Upon discovery of the relationship, the learning function in CCN-flow association FA 218 maps the send ring, and/or one or more shaper CCN IDs in the packet descriptor path, to the flow. CCN-flow association FA 218 enters the association into its local database for subsequent reference and provides CCN-flow map FM to congestion feedback snooping FS 216 and CCN rate control RC 214. CCN-flow association FA 218 may track the congestion state of all flows until each flow times out.

With the association between flow ID and shaper CCN ID known one way or another, CCN rate control RC 214 may control a congested flow by controlling a rate of service provided by Tx ring scheduler TxRS 208, which in turn may be controlled by controlling a rate of one or more shapers in the hierarchical path that packet descriptors travel from an assigned ring through Tx ring scheduler TxRS 208. Congestion may be tracked as an ongoing matter. Congestion may increase, decrease or clear. These and other variables may be accounted for by a congestion control algorithm when determining a rate for one or more shapers associated with a flow. For example, CCN rate control RC 214 may access states and configurations of each shaper, including a rate of packet descriptor traffic passing through each CCN as well as the configuration of each scheduler element, e.g., first through seventh schedulers Sch1-7. A rate control algorithm may be periodically executed to determine new rates of service provided by shapers that must be controlled, e.g., to control congested flows associated with the shapers.

A suitable rate control function for shapers (i.e., congestion control nodes) may be implemented in hardware, or a combination hardware with one or both of firmware and/or software, where firmware may be running on an embedded processor or microcontroller. Design criteria may influence various implementations of CCN rate control RC 214. For example, bandwidth of HCC NIC 204, the number of flows, congestion reaction time tolerances and other factors may determine implementation of CCN rate control RC 214 in hardware, or hardware with firmware and/or software.

The configuration of Tx Ring Scheduler TxRS 208, the states of send ring shapers (i.e., first level of shapers Ringo-k, Ringm-n) and shapers in other levels, traffic rates through each shaper, etc. is available to CCN Rate Control RC 214. Given knowledge or visibility of flows at flow levels, VM levels and tenant levels, rates of the flows at any given time, congestion states of the flows and other information, HCC NIC 204 has the ability to raise an alert as necessary, such as when multiple flows of a VM are congested. Such an alert may prompt moving the VM to another host in a less congested part of the network, for example.

Figure 3:
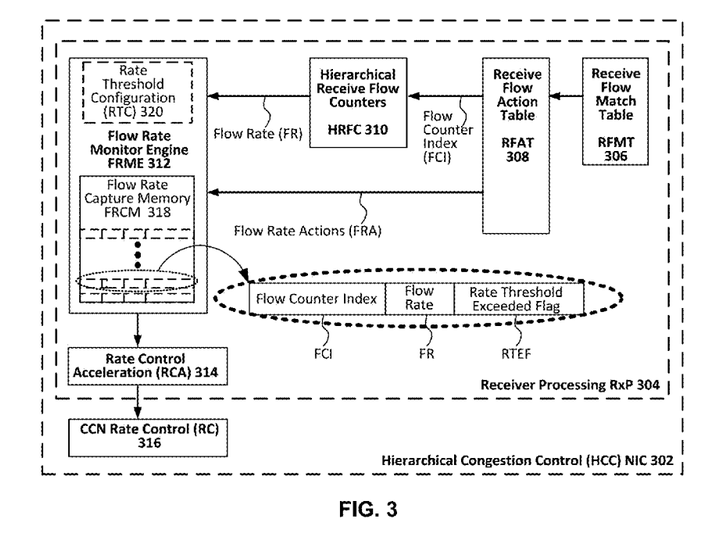
FIG. 3 shows a block diagram of an exemplary embodiment of hierarchical end-to-end congestion control with congested flow identification hardware receiver functions.

FIG. 3 shows a block diagram of an exemplary embodiment of hierarchical end-to-end congestion control with congested flow identification hardware receiver functions. Presented in FIG. 3 is a receiver processing RxP 304, which is one of many possible embodiments of receiver processing RxP 212 shown and discussed in part in FIG. 2. Receiver processing RxP 304 configures a HCC NIC 302 for end-to-end (e2e) congestion control mechanisms, including but not limited to EyeQ and Gatekeeper. HCC NIC 302 is another example of HCC NIC 108 of FIG. 1.

e2e congestion control mechanisms do not require any involvement of network elements to control network congestion. Instead, e2e congestion management involves two VM pairs in network 100 (FIG. 1), a source that generates traffic and a receiver that receives the traffic. This results in VM pairs. For example, one of the VMs in first server SP1, i.e., VM1-n, may form a VM pair with one of the VMs, i.e., VMa-m, in fourth server EP1 112. e2e mechanisms attempt to provide a simple performance abstraction of a dedicated network for each tenant by treating a tenant's source VMs and endpoints as if a tenant had its own private network between source VMs and endpoints, unaffected by other tenant traffic sharing the same network or VMs on the same or different servers. Endpoints may be anywhere in network 100, but a tenant should be able to attain full line rate for any traffic pattern between its endpoints, constrained only by endpoint capacities. Bandwidth assurances to each tenant should suffer no negative impact from the behavior and churn of other tenants in network 100.

End-to-end congestion management dynamically controls congestion between sending and receiving VMs by adjusting to changing bottlenecks in the network. An e2e flow control mechanism, such as the one shown in FIG. 3, performs several tasks. HCC NIC 302 comprising e2e receiver processing RxP 304 allows an administrator to provision minimum and maximum bandwidth for each sender (e.g., a sender VM). CCN rate control RC 214 partitions receiver bandwidth among senders (e.g., sender VMs) so that bandwidth allocated to each sender VM is within the minimum and maximum bandwidth the administrator set for the sender. The traffic rate from each sender (e.g., sender VM) to each destination in the receiver (e.g., receiver VM) is continuously monitored. Feedback is provided to each sender (e.g., sender VM) to increase the flow rate when additional bandwidth can be allocated and to throttle the flow rate to accommodate other senders. Each sender (e.g., sender VM) processes feedback messages from each receiver and rate controls the traffic between sender and receiver VM pairs. A sender may have different flows of traffic to different receivers and each receiver will send feedback messages to the sender to control the rate of the corresponding flow. These sender VM rate control tasks are performed by HCC NIC 204 by rate controlling shapers (CCNs) as previously discussed in FIG. 2.

The task of continuously monitoring traffic rates between VM pairs in e2e congestion control may be accomplished as shown in FIG. 3. Receiver processing RxP 304 may monitor thousands of flows, determine which flows among those thousands of flows need to be rate controlled and communicate rate control to VM senders. Receiver processing RxP 304 provides hardware acceleration for these tasks.

Receiver processing RxP 304 comprises receive flow match table RFMT 306, receive flow action table RFAT 308, hierarchical receive flow counters HRFC 310, flow rate monitor engine FRME 312, and rate control acceleration RCA 314.

Receive flow match table RFMT 306 has an entry for each flow of packets received by HCC NIC 302. Receive flow match table RFMT 306 may be configured by software. When a packet is received, receiver processing RxP 304 hardware may lookup flow match table RFMT 306. If there is a match between the set of fields in the packet header in received packet RPKT and a set of fields in an entry in received flow match table RFMT 306 then received flow action table RFAT 308 may associate Flow Counter Index FCI with the matched flow in received flow match table RFMT 306. Flow Counter Index FCI may contain an index to a flow counter or a set of indices for hierarchical receive flow counters HRFC 310. If there is no match then a new counter(s) and index or indices may be added for a flow. RFAT 308 may also send flow rate actions FRAs to flow rate capture memory FRME 312.

HRFCs 310 monitor flow rates. For example, the rate of a particular flow and aggregate rates of all flows from a sender VM can be monitored in separate counters if Flow Counter Index FCI contains indices for separate counters. Each flow counter in HRFCs 310 may count bytes in packets or number of packets received in the corresponding flow. Flow match counters may be flat (single level) or hierarchical. Each counter generates a flow count or rate FR, representing a number of packets or bytes received in a given period, for processing by flow rate monitor engine FRME 312.

FRME 312 is a hardware engine that accelerates the receive function for e2e congestion control. FRME 312 scans thousands of flow counts or rates FRs from flow counters in HRFCs 310 and identifies flows that must be processed, e.g., by Host software. FRME 312 may essentially act as a filter that periodically notifies Host software about flows that need special attention. Specific flows that need Host processing may be selected by rules configured in FRME 312 by Host software. Rules may be determined by an e2e congestion control algorithm.

FRME 312 comprises rate threshold configuration RTC 320 and flow rate capture memory FRCM 318. Rate threshold configuration RTC 320 comprises a set of configured thresholds. Thresholds may comprise minimum and maximum rates. Thresholds may be set by Host software. FRME 312 may periodically compare each threshold to one or more corresponding flow rates FRs provided by HRFCs 310. For example, at the end of every 100 μs period a comparison may be made.

Flow Rate Capture Memory FRCM 318 may store statistics provided to or generated by FRME 312 for flows that need to be processed, e.g., by Host software. Statistics stored may include without limitation, flow counter index FCI, flow rate FR and rate exceeded threshold flag RTEF. The rules for selecting specific flows from thousands of flows may be configured by Host software in FRME 312. For example, rules that may lead to storing statistics for a particular flow may include, without limitation, flows with rates that have exceeded a rate threshold, flows with rates that fall within a certain range and flows that may be configured to be captured irrespective of their rates, etc.

Rate control acceleration RCA 314 may periodically transfer or mirror the contents of flow rate capture memory FRCM 318 to memory accessible by CCN rate control (RC) 316, which is an example of CCN rate control 214 of FIG. 2. For example, transfer may occur by a DMA hardware engine configured by Host software to automatically transfer every 100 μs to permit overwriting flow rate capture memory FRCM 318. CCN rate control RC 316 may use statistics or data in the memory to divide receiver bandwidth among senders or particular flows.

III. Exemplary Method

Figure 4:
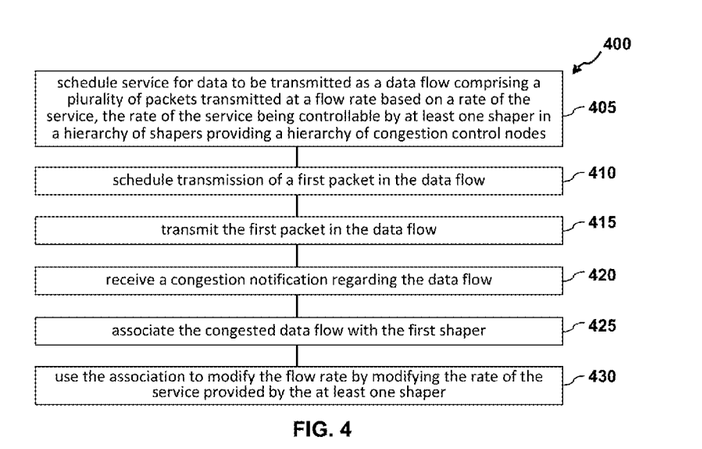
FIG. 4 shows a flowchart of an exemplary method of operating a network controller having hierarchical congestion control with congested flow identification hardware.

Embodiments may also be implemented in processes or methods. For example, FIG. 4 shows a flowchart of an exemplary method 400 of operating a network controller having hierarchical congestion control with congested flow identification hardware. HCC NIC and other embodiments may operate in accordance with method 400. Method 400 comprises steps 405 to 430. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 4. FIG. 4 is simply one of many possible embodiments. Embodiments may implement fewer, more or different steps.

Method 400 begins with step 405. In step 405, service is scheduled for data to be transmitted as a data flow comprising a plurality of packets transmitted at a flow rate based on a rate of the service, the rate of the service being controllable by at least one shaper in a hierarchy of shapers providing a hierarchy of congestion control nodes. For example, as shown in FIG. 2, data to be transmitted is stored in Host memory HM 206, packet descriptors for that data are written to a ring, and Tx ring scheduler TxRS 208 schedules service for the data (based on the packet descriptors). This results in access to the data in host memory HM 206 and serviced packets SP being provided to CCN flow association FA 218. The rate of service provided to the data by selecting data descriptors for data queuing is controlled by multiple levels of shapers in a hierarchy that provide a hierarchy of congestion control nodes (CCNs).

At step 410, transmission of a first packet in the data flow is scheduled. For example, as shown in FIG. 2, serviced packets SPs are stored in a queue, with transmission scheduled from the queue to network port by TxQ scheduler TxQS 210.

At step 415, the first packet in the data flow is transmitted. For example, as shown in FIG. 2, TxQ scheduler selects packets for transmission at eighth scheduler Sch8 and the selected packets are transmitted through Network port.

At step 420, a congestion notification regarding the data flow is received. For example, as shown in FIG. 2, in a received packet RPKT there is a congested feedback message CFM.

At step 425, the congested data flow is associated with the first shaper. For example, as shown in FIG. 2, depending whether the congestion notification is in band or out of band, congestion feedback snooping FS 216 and/or CCN flow association FA 218 determine the association between the flow indicated to be congested and one or more shapers in the hierarchy of shapers.

At step 430, the association is used to modify the flow rate by modifying the rate of the service provided by the at least one shaper. For example, as shown in FIG. 2, CCN rate control RC 214 generates a CCN rate signal to rate control one or more shapers, which controls the rate that packet descriptors for the data in the flow are scheduled that, in turn, controls the rate at which data in the flow is queued for transmission.

Figure 5:
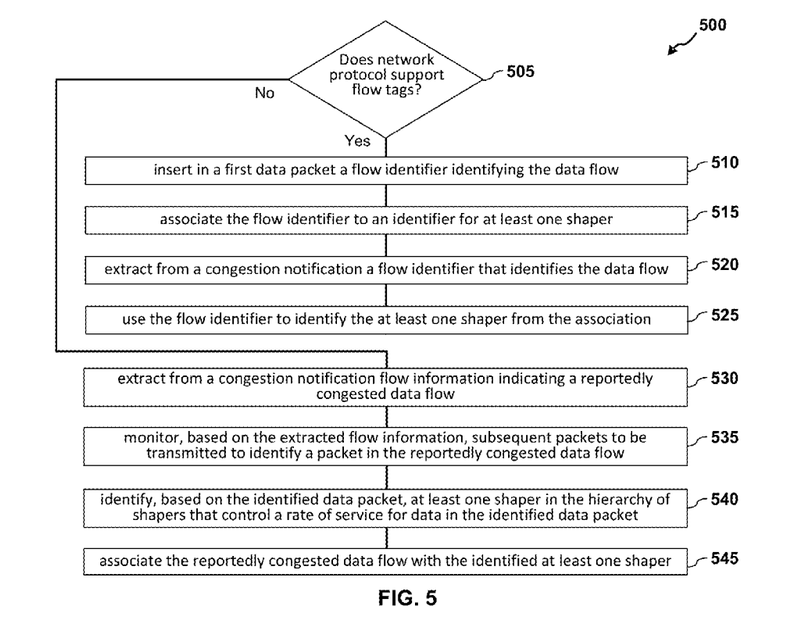
FIG. 5 shows a flowchart of an exemplary method of associating a data flow and a shaper congestion control node in a network controller having hierarchical congestion control with congested flow identification hardware.

According to another embodiment, FIG. 5 shows a flowchart of an exemplary method 500 of associating a data flow and a shaper congestion control node in a network controller having hierarchical congestion control with congested flow identification hardware. HCC NIC and other embodiments may operate in accordance with method 500. Method 500 comprises steps 505 to 545. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 5. FIG. 5 is simply one of many possible embodiments. Embodiments may implement fewer, more or different steps.

Method 500 begins with step 505. In step 505, a determination is made whether a network protocol supports flow tags. For example, as shown and discussed with respect to FIG. 2, CCN flow association FA 218 and congestion feedback snooping FS 216 may operate in multiple modes depending whether congestion notifications comprise flow tags. The presence or absence of a flow tag impacts processing, as indicated by separate flow steps in FIG. 5, i.e., flow steps 510 to 525 if flow tags are supported and flow steps 530 to 545 if they are not supported.

In step 510 (having established that flow tags are supported), a data flow identifier identifying a data flow is inserted in a first data packet. For example, as shown in FIG. 2, CCN flow association FA 218 receives serviced packets SP and modifies them by inserting a flow identifier, e.g., by setting a field in serviced packet SP, when flow tags are supported.

In step 515, the flow identifier is associated to an identifier for at least one shaper. For example, as shown in FIG. 2, CCN-flow association FA 218 generates CCN-flow map FM and provides it to congestion feedback snooping FS 216 and CCN rate control RC 214.

In step 520, a flow identifier that identifies a data flow is extracted from a congestion notification. For example, as shown in FIG. 2, congestion feedback snooping FS 216 extracts a flow identifier from congestion feedback message CFM when flow tags are supported.

In step 525, the flow identifier is used to identify at least one shaper from an association to the flow identifier. For example, as shown in FIG. 2, using CCN flow map FM, congestion feedback snooping FS 216 uses the flow identifier to identify a shaper according to its CCN-ID, which is provided to CCN rate control RC 214.

In step 530, having established that flow tags are not supported, flow information indicating a reportedly congested data flow is extracted from a congestion notification. For example, as shown in FIG. 2, congestion feedback snooping FS 216 extracts flow IIIDDD info FI from congestion control message CFM when flow tags are not supported.

In step 535, subsequent packets to be transmitted are monitored, based on the extracted flow information, to identify a packet in the reportedly congested data flow. For example, as shown in FIG. 2, CCN flow association FA 218 monitors serviced packets SP based on flow ID info FI to identify a serviced packet having the same flow information.

In step 540, at least one shaper in the hierarchy of shapers that control a rate of service for data in the identified data packet is identified, based on the identified data packet. For example, as shown in FIG. 2, CCN flow association FA 218 uses the identified packet to identify the ring and shapers that packet identifiers travel through in Tx ring scheduler TxRS 208.

In step 545, the reportedly congested data flow is associated with the identified at least one shaper. For example, as shown in FIG. 2, CCN flow association FA 218 associates the congested data flow and at least one shaper and generates CCN-flow map FM with the association.

Figure 6:
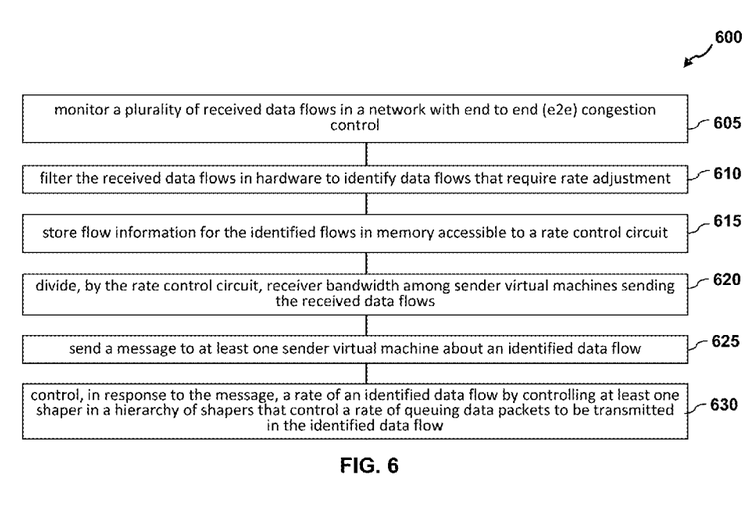
FIG. 6 shows a flowchart of an exemplary method of operating a network controller having hierarchical end-to-end congestion control with congested flow identification hardware receiver functions.

According to still another embodiment, FIG. 6 shows a flowchart of an exemplary method 600 of operating a network controller having hierarchical end-to-end congestion control with congested flow identification hardware receiver functions. HCC NIC and other embodiments may operate in accordance with method 600. Method 600 comprises steps 605 to 630. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 6. FIG. 6 is simply one of many possible embodiments. Embodiments may implement fewer, more or different steps.

Method 600 begins with step 605. In step 605, a plurality of received data flows in a network with end to end (e2e) congestion control are monitored. For example, as shown in FIG. 3, receiver processing RxP 304 monitors received data flows in a network with e2e congestion control.

In step 610, the received data flows are filtered in hardware to identify data flows that require rate adjustment. For example, as shown in FIG. 3, flow rate monitor engine periodically compares flow rate data to thresholds to determine which flows require further processing, e.g., by Host software.

In step 615, flow information for the identified flows is stored in memory accessible to a rate control circuit. For example, as shown in FIG. 3, flow rate monitor engine FRME 312 stores in flow rate capture memory FRCM 318 the flow information for identified flows in need of special processing. For example, flow counter index FCI, flow rate FR and rate threshold exceeded flag RTEF are stored, perhaps with additional information for identified flows.

In step 620, receiver bandwidth is divided by the rate control circuit among sender virtual machines sending the received data flows. For example, as shown in FIG. 3, CCN rate control RC 214 divides available bandwidth among sender VMs based on an algorithm implemented in hardware, or hardware combined with firmware and/or software using received flow information.

In step 625, a message is sent to at least one sender virtual machine about an identified data flow. For example, as shown in FIG. 2, an acknowledge packet or other packet is sent by HCC NIC 204 to a device executing a sending VM responsible for the identified flow.

In step 630, a rate of an identified data flow is controlled in response to the message by controlling at least one shaper in a hierarchy of shapers that control a rate of queuing data packets to be transmitted in the identified data flow. For example, as shown in FIG. 2, upon receipt of a congestion feedback message CFM or the like indicating a flow rate threshold has been exceeded within a received packet RPKT, a congested flow may be rate controlled by controlling at least one shaper in a hierarchy of shapers in Tx ring scheduler TxRS 208 that control a rate of queuing data packets to be transmitted in the identified (e.g., congested or threshold exceeding) data flow.

IV. Conclusion

Methods, systems, and apparatuses have been described for hierarchical congestion identification and control hardware. There are many advantages to implementation of embodiments of HCC NIC. HCC NIC provides congestion control while satisfying tenant level service guarantees in multi-tenant environments. Hierarchical architecture, flow configurations or assignments and hierarchical, multi-level rate control of data servicing prior to packet queuing, hardware implementation, multi-mode operation adapting to multiple protocols and environments, learning functionality and other features contribute to HCC NIC solving more than one problem with the state of the art network congestion control mechanisms.

Problems with state of the art network congestion control are addressed in several ways in many possible embodiments. For example, implementation of congestion management in hardware responds to congestion feedback faster than software running on a host processor. Hardware implementation reduces congestion fast and, at the same time, maintains network efficiency. Further, hardware implementation saves host processor computing bandwidth for applications by avoiding computationally-intensive congestion feedback analysis and flow rate controls. Implementation supports congestion control of standard TCP/UDP flows without packet modification and permits integration with known congestion communication protocols, which results in fast hardware congestion control with both existing and future network equipment.

Additionally, HCC NIC avoids several problems with proposals underlying HULL, including aggregate flow control, perhaps in violation of SLAs, deep buffering in transmission queues, flow switching among queues and rings, packet reordering, etc. All of these problems are avoided by HCC NIC rate controlling shapers (i.e., CCNs) in the Tx ring scheduler to control a service flow rate for packet descriptors. Rate controlling hierarchical shapers results in packet buildup in inexpensive Host memory instead of expensive hardware packet buffers in a fast 40G/50G/100G NIC.

Techniques, including methods, described herein may be implemented in hardware (digital and/or analog) or a combination of hardware with software and/or firmware component(s), including computer program products comprising logic stored on any discrete or integrated computer readable medium(s) comprising computer executable instructions that, when executed by one or more processors, provide and/or maintain one or more aspects of functionality described herein.

Proper interpretation of subject matter described herein and claimed hereunder is limited to patentable subject matter under 35 U.S.C. §101. As described herein and claimed hereunder, a method is a process defined by 35 U.S.C. §101 and each of a circuit, device, apparatus, machine, system, computer, module, media and the like is a machine and/or manufacture defined by 35 U.S.C. §101.

Embodiments have been presented by way of example and not limitation. Embodiments are not limited to the functional blocks, detailed examples, steps, order or the entirety of subject matter presented. Alternative embodiments may use other techniques and/or steps within the spirit and scope of the disclosed technology. The exemplary appended claims encompass embodiments and features described herein, modifications and variations thereto as well as additional embodiments and features that fall within the spirit and scope of the disclosed technologies. Thus, the breadth and scope of the disclosed technologies is not limited by foregoing exemplary embodiments.

What is claimed is:

1. A method comprising:
scheduling service for data to be transmitted as a data flow comprising a plurality of packets transmitted at a flow rate based on a rate of the service, the rate of the service being controllable by at least one shaper in a hierarchy of shapers providing a hierarchy of congestion control nodes;
providing a choice between a plurality of congestion control nodes in the hierarchy of congestion control nodes for selective application of congestion control at one or more of the plurality of congestion control nodes;
scheduling transmission of a first packet in the data flow;
transmitting the first packet in the data flow;
receiving a congestion notification regarding the data flow; and
selecting at least one congestion control node in the plurality of congestion control nodes for the selective application of congestion control by associating the congested data flow with the at least one shaper.

2. The method of claim 1, further comprising:
using the association to modify the flow rate by modifying the rate of the service provided by the at least one shaper.

3. The method of claim 2, wherein said modifying the rate of the at least one service comprises:
providing hierarchical congestion control by choosing among options to modify a rate of service provided by a first shaper at a first level in the hierarchy and a rate of service provided by a second shaper at a second level in the hierarchy of shapers.

4. The method of claim 3, wherein said providing hierarchical congestion control comprises:
choosing among options to control the rate of the data flow alone and combined with other flows in an aggregate data flow by choosing among options to control the first shaper and the second shaper in multiple levels of the hierarchy of shapers.

5. The method of claim 3, wherein said providing hierarchical congestion control comprises:
choosing among options to control the rate of the data flow at two or more of a virtual machine level without affecting a rate of data for other virtual machines, a tenant level without affecting a rate of data flow for other tenants and a flow level without affecting a rate of data flow for other flows by choosing among options to control the first shaper and the second shaper in multiple levels of the hierarchy of shapers.

6. The method of claim 1, wherein said associating comprises:
inserting in a first data packet a flow identifier identifying the data flow; and
associating the flow identifier to an identifier for the at least one shaper.

7. The method of claim 6, wherein said associating comprises:
extracting from the congestion notification a flow identifier that identifies the data flow; and
using the flow identifier to identify the at least one shaper from the association.

8. The method of claim 1, wherein said associating comprises:
extracting from the congestion notification flow information indicating a reportedly congested data flow;
monitoring, based on the extracted flow information, subsequent packets to be transmitted to identify a packet in the reportedly congested data flow;
identifying, based on the identified data packet, at least one shaper in the hierarchy of shapers that control a rate of service for data packetized in the identified data packet; and
associating the reportedly congested data flow with the identified at least one shaper.

9. The method of claim 1, further comprising:
storing information comprising:
configuration of a service scheduler;
associations between a plurality of shapers in the hierarchy of shapers and a plurality of data flows;
congestion states for each data flow; and
configured rates of the plurality of shapers.

10. The method of claim 9, further comprising:
executing, based on the stored information, a flow control algorithm to determine new rates for shapers associated with congested data flows.

11. The method of claim 10, further comprising:
raising an alert, based on the stored information, when multiple flows of a virtual machine are reportedly congested.

12. An apparatus comprising:
a service scheduler configured to schedule service for a plurality of data to be transmitted as a plurality of data flows each comprising a plurality of packets, the service scheduler comprising a hierarchy of shapers providing a hierarchy of congestion control nodes that control a rate of each data flow by controlling a rate of the service for each data to be transmitted;
a packet transmission scheduler configured to schedule transmission of the plurality of packets for each of the data flows; and
a congestion circuit configured to select between a plurality of congestion control nodes in the hierarchy of congestion control nodes for selective application of congestion control to one or more of the plurality of congestion control nodes by identifying at least one shaper in the hierarchy of shapers that control a rate of the service for a congested data flow.

13. The apparatus of claim 12, further comprising:
a flow rate controller configured to access states and configurations for shapers and to modify the rate of the congested data flow by modifying the rate of the service provided by the identified at least one shaper.

14. The apparatus of claim 13,
wherein the apparatus comprises a network interface controller and the service scheduler comprises a transmission ring scheduler in the network interface controller.

15. The apparatus of claim 13, wherein the hierarchy of shapers providing a hierarchy of congestion control nodes is configured to permit the flow rate controller to control the rate of the congested data flow at two or more of a virtual machine level, a tenant level and a flow level by controlling rates of service provided by shapers at different levels in multiple levels of the hierarchy of shapers.

16. The apparatus of claim 12, wherein the congestion circuit is configured to associate or identify at least one shaper in the hierarchy of shapers with at least one data flow before and after a congestion notification is received about the data flow.

17. A method comprising:
monitoring a plurality of received data flows in a network with end to end (e2e) congestion control;
filtering the received data flows in hardware to identify data flows for congestion control;
storing flow information for the identified flows in memory accessible to a rate control circuit that selects between a plurality of congestion control nodes in a hierarchy of congestion control nodes for selective application of congestion control at one or more of the plurality of congestion control nodes;
dividing, by the rate control circuit, receiver bandwidth among sender virtual machines sending the received data flows; and
sending a message to at least one sender virtual machine about an identified data flow.

18. The method of claim 17, further comprising:
controlling, in response to the message, a rate of an identified data flow by controlling at least one shaper in a hierarchy of shapers that control a rate of queuing data packets to be transmitted in the identified data flow.

19. The method of claim 17, wherein said filtering and said storing occur periodically according to a period, and wherein said storing the flow information comprises:
transferring, in accordance with the period, the stored flow information from a hardware table to memory accessible to the rate control circuit.

20. The method of claim 17, wherein said filtering the data flows to identify data flows that require rate adjustment comprises:
periodically comparing a flow counter for each flow to a threshold for each flow to identify flow rates in excess of the threshold.

* * * * *